United States Patent [19]

Ballas

[11] 4,104,797
[45] Aug. 8, 1978

[54] ROTARY CUTTING ASSEMBLY

[75] Inventor: George C. Ballas, Houston, Tex.

[73] Assignee: Weed Eater, Inc., Houston, Tex.

[21] Appl. No.: 747,004

[22] Filed: Dec. 2, 1976

Related U.S. Application Data

[63] Continuation-in-part of Ser. No. 633,456, Nov. 19, 1975, Pat. No. 4,035,912, which is a continuation-in-part of Ser. No. 321,580, Jan. 8, 1973, Pat. No. 3,826,068, which is a continuation-in-part of Ser. No. 207,198, Dec. 13, 1971, Pat. No. 3,708,967.

[51] Int. Cl.² .................... A01D 55/18; B26B 27/00
[52] U.S. Cl. ........................................ 30/276; 56/12.7
[58] Field of Search ................... 30/276, 347; 56/12.7, 56/295; 51/335

[56] References Cited

U.S. PATENT DOCUMENTS

| 2,194,577 | 3/1940 | Vonnegut | 51/335 |
| 2,452,409 | 10/1948 | Wickman | 51/335 |
| 2,854,798 | 10/1958 | De Haven | 51/335 |
| 3,826,068 | 7/1974 | Ballas et al. | 56/12.7 |

FOREIGN PATENT DOCUMENTS 556,632  12/1974  Fed. Rep. of Germany ............ 30/276

Primary Examiner—Jimmy C. Peters

[57] ABSTRACT

Apparatus for cutting, trimming, and edging vegetation, and the like, is provided with a rotatable disc-like head having a plurality of string-like members removably attached thereto and extending from its periphery. When the head is rotated, the strings will extend therefrom so as to cut adjacent vegetation in a flail-like manner. Snubber means are provided to arcuately deform the string in order to secure the string within the head.

20 Claims, 6 Drawing Figures

ROTARY CUTTING ASSEMBLY

RELATED PATENT APPLICATION

This application is related to and is a continuation-in-part of a co-pending U.S. patent application Ser. No. 633,456, filed Nov. 19, 1975, now U.S. Pat. No. 4,035,912 which is a continuation-in-part of a co-pending U.S. patent application Ser. No. 321,580, filed Jan. 8, 1973, now U.S. Pat. No. 3,826,068 which in turn is a continuation-in-part of then co-pending U.S. patent application Ser. No. 207,198, filed Dec. 13, 1971, and which is now U.S. Pat. No. 3,708,967.

BACKGROUND OF THE INVENTION

This invention relates to an improved cutting assembly in the form of a rotary head for a rotary lawn mower, edger, trimmer or the like. The preferred embodiment is in the form of a portable sling-held type lawn mowing and edging tool wherein the cutting element is safe in most uses and avoids the hazardous conditions created by prior art devices. More particularly, the cutting assembly disclosed herein is of the type depicted in U.S. Pat. No. 3,826,068, and is an improvement thereover.

The prior art is prolix with attempts at solutions to provide a safe, efficient, and simply constructed rotary head for rotary lawn mowers, edgers, trimmers and the like. Heretofore, the rotary head, or cutting blade, of rotary lawn mowers, edgers, and the like, have comprised a rotating metal bar or the like which is rotated at sufficient speeds to effect cutting of grass, weeds or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following West German Petty Pat. Nos. 6,919,841; 6,919,842; 6,919,843; 6,919,844; 6,938,265; 7,043,648; and 7,238,972 one or more embodiments of a lawn mowing or trimming device having a disc-like head member arranged to be rotated by an electric motor, and containing a spool which is housed therein in coaxial relationship to the shaft of the motor. A length of flexible non-metallic line is coiled about the spool, whereby its free travelling end extends generally peripherally from the spool and head, and whereby such free travelling end will be swung arcuately about upon actuation of the motor to cut adjacent vegetation in the manner of a flail.

Use of the German device has revealed that, under ideal operating conditions, it will cut or trim grass and other light-weight vegetation with reasonable effectiveness. Furthermore, it possesses the significant advantage that it is much safer to use than the more conventional cutters, in that it does not cause stones or other solid objects to be discharged in the same dangerous manner, and it is almost completely incapable of causing any significant injury to persons or pets struck by the flailing cutting string. In fact, it is a reasonable statement that the German device will actually cut substantially only the vegetation to which it is directed.

On the other hand, the German device is also subject to certain disavantages of a magnitude such as to severely limit if not destroy its practical value. In the first place, it is largely effective to cut standing light-weight vegetation but is almost completely useless for any other task. In the second place, it will only cut such vegetation if growing relatively sparsely, and it cannot effectively handle even light-weight vegetation if encountered in a rank condition. A more serious disadvantage, however, is that in the German device the cutting string experiences a breakage rate which is so high as to nullify all of its advantages and to keep such a device from having much commercial value.

There is also depicted and described in U.S. Pat. No. 3,826,068 a cutting and trimming device having a housing arranged to be rotated, and containing four spools housed therein. A length of flexible non-metallic line is coiled about each spool whereby the free travelling ends of the four lines extend generally peripherally from the housing and whereby these free travelling ends will be swung arcuately about upon rotation of the housing to cut adjacent vegetation in the manner of flails.

Use of the device of U.S. Pat. No. 3,826,068 has revealed that it will cut or trim grass and other vegetation with maximum effectiveness. Furthermore, like the German device, it possesses the significant advantage that it is much safer to use than the more conventional cutters, in that it does not cause stones or other solid objects to be discharged in the same dangeros manner, and it is almost completely incapable of causing any significant injury to persons or pets struck by the flailing cutting strings. The device of U.S. Pat. No. 3,826,068 will actually cut substantially only the vegetation to which it is directed.

On the other hand, the device of U.S. Pat. No. 3,826,068 is also subject to certain minor disadvantages of a magnitude such as not to limit its practical value but which reduce the efficiency thereof to a slight degree. In the first place, it has been found that the centrifugal force generated upon rotation of the housing causes the spools therein to become misaligned with the compartments housing them. This misalignment problem has been traced to the fact that the thrust springs urging the spools into the compartments are not sufficiently anchored to the lower cup member of the device. Thus, upon rotation of the housing, the thrust springs are moved out of alignment with the axis of the compartment housing each spool. This movement of the thrust spring in turn causes the spool in that compartment to misalign with respect to the axis of that compartment. The resultant misalignment of the spools renders it somewhat difficult to pay out the line members when it is desired to replace the flail portions thereof due to wear. In the second place, it has been found that the coil-like winding of the line member on the spool tends to exert a force on the line member seeking to retract the line member back upon the spool after the line has been payed out to replace the worn flail portion thereof. This is especially true as the amount of line on the spool falls to a minimal length. Thus, the winding of the line upon the spool acts as a spring and when withdrawn from the spool acts with a force to retract a portion of the payed out and extended line member back upon the spool. This retraction of the line member renders it somewhat difficult to maintain a fixed and predetermined length of flail line portion.

One attempt to solve the above line retraction problem has been set forth in U.S. Pat. No. 3,928,911, wherein a pivoted toothed jaw is provided to pinch the line member in place. This device, however, suffers from the serious disadvantage that the pressure of the toothed jaw on the line member injures the line member and produces weakness and flaws therein. Thus, the teeth of the jaw cause internal flaws and indentations in the line member which is highly undesirable, since such flaws and indentations weaken the line and contribute to line breakage as the weakened and indented section is withdrawn and used as the flail portion of the cutting assembly.

It will be readily apparent from a consideration of the teachings hereinafter provided that a cutting string which is free from internal flaws or other defects will not usually break except as a result of being struck against or across a relatively immovable object. The cutting string may, of course, be formed of a metal wire or heavy strap in order to provide it with a tensile strength sufficient to resist such impact, but such a string will create substantially the same dangerous conditions which exist when the cutting element is a rigid blade or the like.

These disadvantages of the prior art are overcome with the present invention, and a commercially acceptable embodiment of a vegetation cutter and the like is herein provided which is not only fully capable of cutting vegetation under most operating conditions, but which is also fully capable of other tasks completely beyond the capabilities of the prior art, such as cleaning dead leaves, trash and other such debris from along fences, walls, and the trunks or stems of trees and bushes. More particularly, however, the embodiment of the present invention is capable of operation with a much lower breakage rate for its cutting strings, without any sacrifice whatsoever of the safety features and advantages hereinbefore accorded to the prior art cutting devices.

SUMMARY OF INVENTION

This invention is for an improved cutting assembly for a rotary lawn mower, edger, trimmer or the like. It includes a body member arranged for rotation about an axis generally perpendicular with or normal to the cutting plane. It preferably includes at least four nonmetallic cutting lines attached to the body member for rotation therewith in the cutting plane. Each line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is at least 75:1. Certain embodiments of the invention include means for detachably securing the lines to the body member so that the same may be replaced after wear. Means may also be included with the body member for storing supplies of line in the non-working condition whereby the effective working length of the lines may be lengthened at desired times as the working length becomes shortened during use thereof. Certain embodiments of the invention may have line storage means supported in the body member, which storage means are in the form of aligned spools which are locked from rotation, but which may be released so that additional line may be payed out as the effective working length becomes shortened during use. Another particularly significant feature is that the configuration of the cutting head is such as to prevent line retraction, as will hereinafter be explained in detail.

In the present invention, a circular head member is provided which contains four separate spools spaced about the axis of the head. Each spool supports a separate cutting strand or string, which greatly enhances the ability of this device to cut through impacted vegetation and the like, and to permit this device to perform tasks which are completely beyond the capacity of devices such as that described and depicted in the aforementioned German patents.

It has been discovered that when two or more cutting strands are employed for present purposes, there is serious likelihood that the strands may become entangled with each other and, in such an event, breakage will frequently occur. Even when breakage does not occur, however, the user of the equipment is required to stop work and disentangle the strings, since very little cutting can be accomplished when the cutting strings are entangled about the head assembly.

In the present invention, wherein the head assembly is adapted to support four separate cutting strings, this disadvantage is minimized or substantially eliminated by winding each cutting string onto a separate aligned spool and by disposing the four aligned spools radially within the head assembly as hereinbefore mentioned. In addition, however, it is a particular feature of the present invention to provide cutting strings having a length such as to maximize the cutting effectiveness of the apparatus, and also such as to minimize the likelihood of line retraction and entanglement.

Inasmuch as the proper length of the cutting members is a significant feature of the present invention, it is a feature of the four-strand arrangement to provide to convenient technique for paying out substantially the proper length of strand in the event breakage occurs. Accordingly, and as will hereinafter be described in detail, the spools are aligned and recessed in socket-like compartments within the circular head, whereby a detent effect is achieved to limit rotation of each spool within the head.

In its broadest concept, any type of motor may be employed for purposes of the present invention to rotate the aforementioned head assembly. A four-string cutting device has greater cutting capabilities than a two-string cutting device, for example, however, and thus is more desirable for use in larger areas such as golf courses and the like, or in more heavily impacted or overgrown regions. Under such circumstances, a gasoline-powered engine is normally to be preferred over an electric motor for the simple reason that an electric motor will necessitate a cord for connection with a source of electrical power, and in larger or wilder areas the cord will necessarily be too long to be practical.

On the other hand, an electric motor is cheaper and of ligher weight than a gasoline-driven engine and is therefore far more suitable for a cutting device intended to be employed in residential-size plots or areas, and the like, wherein lesser cutting capabilities are normally required.

These and other features and advantages of the present invention will become apparent from the following detailed description, wherein reference is made to the figures in the accompanying drawings.

IN THE DRAWINGS

FIG. 1 is a view showing an operator operating a portable apparatus having four cutting strings extending peripherally from a rotating circular head assembly or the like.

DETAILED DESCRIPTION

Figure 1:
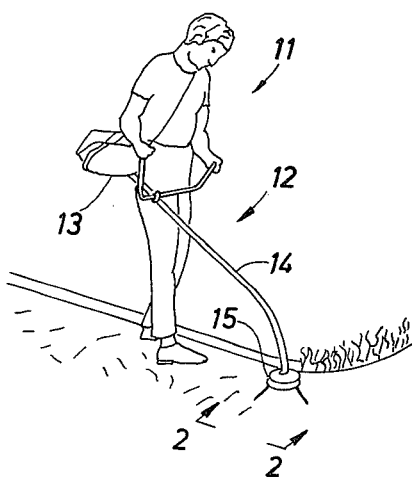

Referring now to FIG. 1, an operator 11 is shown carrying a portable type lawn mowing and edging device generally designated by the numeral 12 and which is of the type preferred for heavier tasks or for use in locations where electrical power is not immediately and conveniently available to the operator 11. Accordingly, the apparatus may be composed of a tubular member or casing 14 having a gasoline-powered engine 13 mounted at one end, and having a four-string circular housing or cutting element 15 rotatable at and about the lower end of the casing 14 by suitable drive means such as a flexible cable or shaft (not depicted in FIG. 1) within the casing 14. Such a device 12 is portable, as indicated in FIG. 1, and the cutting plane of the cutting element 15 may be easily arranged to be either horizontal or vertical, or tilted at any angle, to cut along sidewalks, around trees and rocks, and along fences and the like where it is either unsafe or difficult to cut with conventional apparatus, merely by turning or manipulating the casing 14.

Figure 2:
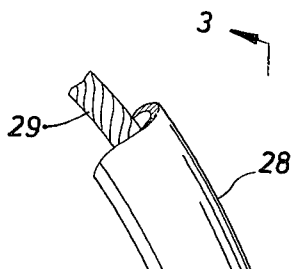
FIG. 2 is a pictorial view taken generally along line 2—2 of FIG. 1 showing the head assembly of this invention in a dynamic or rotating condition.
Figure 6:
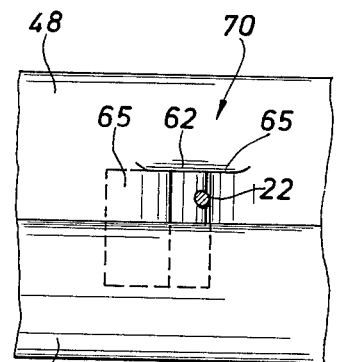
FIG. 6 is a pictorial representation of the portion of the apparatus depicted in FIG. 2 which includes the peripheral aperture through which a cutting line may extend.

Referring now to FIG. 2, there may be seen an enlarged view of the cutting element 15 represented generally in FIG. 1, and more particularly showing how the lower end of the casing 28 houses the lower end of a flexible cable or drive shaft 29, and how the cutting element 15 is composed of a rotary body 48 fixedly secured thereto for circular revolvement about its axis, and a lower closing cup or member 49 attached to the rotary body or housing 48 in a manner hereinafter described.

When the engine 13 is inactivated and the rotary body 48 is in a static condition, the four cutting strands or lines 22 A–D will tend to flexibly dangle from the equally spaced-apart windows 70 A–D to the extent permitted by their inherent characteristics. When the rotary body 48 is rotated at normal operating velocities, however, the lines 22 A–D will tend to stand out rigidly (but also yieldably) from the periphery of the rotary body 48 as indicated in FIG. 2.

The cutting lines 22 A–D may be composed of a variety of materials, as for example an elastoplastic extrusion which has been stretched to align the molecules axially. An example of such line is a nylon monofilament such as fishing line. However, other lines may be used, as for example, yarn, cord, rope, twine, braided line, or monofilament, wheather described as elastoplastic elastomeric, natural fiber, or synthetic fiber, and whether compounded of several materials. Nevertheless, there are certain parameters within which the lines must fall in order to be effective.

The cutting lines 22 A–D should preferably have sufficient fatigue, abrasion, and impact resistance to allow reasonable service life. Further, the lines 22 A–D should have sufficient tensile strength to allow a reasonable service life, and should have as small a diameter as is consistent with the foregoing parameter so that the sharpest cutting edge is provided for effecting cutting of the grass, weeds, or the like. The lines 22 A–D shoul: preferably be as lightweight as possible so that when the line shears or breaks during use and is thrown from the cutter head, it will cause the least damage upon contact with persons or objects.

Effective cutting may be achieved with lines 22 A–D formed of a metal, and such lines will also have a greater tensile strength than if formed of nylon or the like. Metallic lines are more subject to breakage because of fatigue, however, and the relatively greater mass of a piece of metal cutting line will cause it to travel like a projectile for a considerable distance. In addition to this dangerous feature, the fact that the greater mass of a metallic line requires a larger heavier engine 13, makes the use of metallic lines 22 A–D undesirable for present purposes. On the other hand, the relatively small mass of a line 22 formed, for example, of an extruded nylon monofilament, creates complex design problems which must be effectively solved to achieve effective cutting, and this will become even more apparent when it is appreciated that only the last one full inch or so, of each of the lines 22 A–D, is actually impacted against the vegetation sought to be cut.

It has been empirically determined that there is a functional relationship between the weight of the tip (outer one inch) of a cutting line 22, its cross sectional diameter, its swing radius, and the arcuate velocity of the line 22 at its tip. Thus, an effective length-to-diameter ratio for a nylon monofilament line or the like will usually be greater than 50:1 and is preferably 75:1, and it has been found for purposes of the apparatus depicted in FIGS. 1 and 2, that the best cutting lines for the purposes of this invention are extruded nylon line, such as fishing line, having a diameter of about 0.062 inches for cutting grass and about 0.125 inches for cutting weeds, and preferably about 0.080 inches.

Although the aforesaid cutting lines are essentially flexible while in the static condition, they become rigid and taut under dynamic conditions of rotation, as shown in FIG. 2. The normal rotating speed is on the order of 3000–5000 rpms with 4,600 rpm being preferred. During rotation of the cutting lines in the dynamic condition, the cutting lines are caused to become taut and thereby increase the apparent rigidity of the line. These effects are caused by both the rotational speed and the tip speed of the cutting element.

Referring now to FIGS. 2-6, it may be seen that the lower end of the drive shaft 29 in the casing 28 is provided with a square end 30, which is arranged for insertion into a coupling 31 for rotation therewith. Coupling 31 is arranged for rotation in a power head generally designated by the numeral 32, which is arranged for attachment to the lower end of casing 29 as shown. These attaching means take the form of two oppositely spaced apart lobes 33 having screw holes therethrough and in which are mounted a pair of clamping screws 35. In addition, power head 32 is provided with a longitudinal slot 34 intermediate each of lobes 33 such that, upon tightening of clamping screws 35, power head 32 is frictionally attached to casing 28.

The lower end of power head 32 may be provided with an enlarged flange 37 thereabout and with a central aperture therethrough in which is press-mounted a pair of bushings 38 and 39.

The lower end of coupling 31 is arranged for threading engagement with a rigid drive shaft 40 which extends downwardly therefrom and is spaced from the lower end of coupling 31 by thrust washer 41. Shaft 30 extends downwardly through bushings 38 and 39 and is provided with an enlarged portion 42 which acts as a thrust bearing against lower bushing 39 and attached to the lower end thereof is a thrust flange 43 and a lower extending portion 44 which extends downwardly therefrom and is arranged for threading engagement with metal insert 47 embedded in rotary body 48. The body 48 may be of either plastic or metal and is arranged for rotation by shaft 40 and is provided with cutting lines 22 A-D, which are to be described hereinafter.

Rotary body 48 is provided with closing cup member 49 which is arranged for fitting about the bottom portion thereof and extending up about the sides thereof a substantial distance. Rotary body 48 is arranged for demounting from casing 28 by loosening clamping screws 35, which permits removal of power head 32 from casing 28 and separation of drive shaft 29 from coupling 31. Thereafter, shaft 40 can be removed from coupling 31 and power head 32 and, subsequently, unthreaded from rotary body 48, which permits removal of cap 49 and access to the interior of rotary body 48. However, it will also be noted that cap 49 is locked to the rotary body 48 by a bolt 45, which is threadedly connectable to the lower threaded end of the insert 47, and which is secured in the cap 49 by a rotatable bushing 46.

Body 48 is provided with a plurality of means for storing a supply of cutting lines therein, which cutting lines are arranged for paying out at predetermined times to vary the effective working lengths of the cutting lines.

Figure 4:
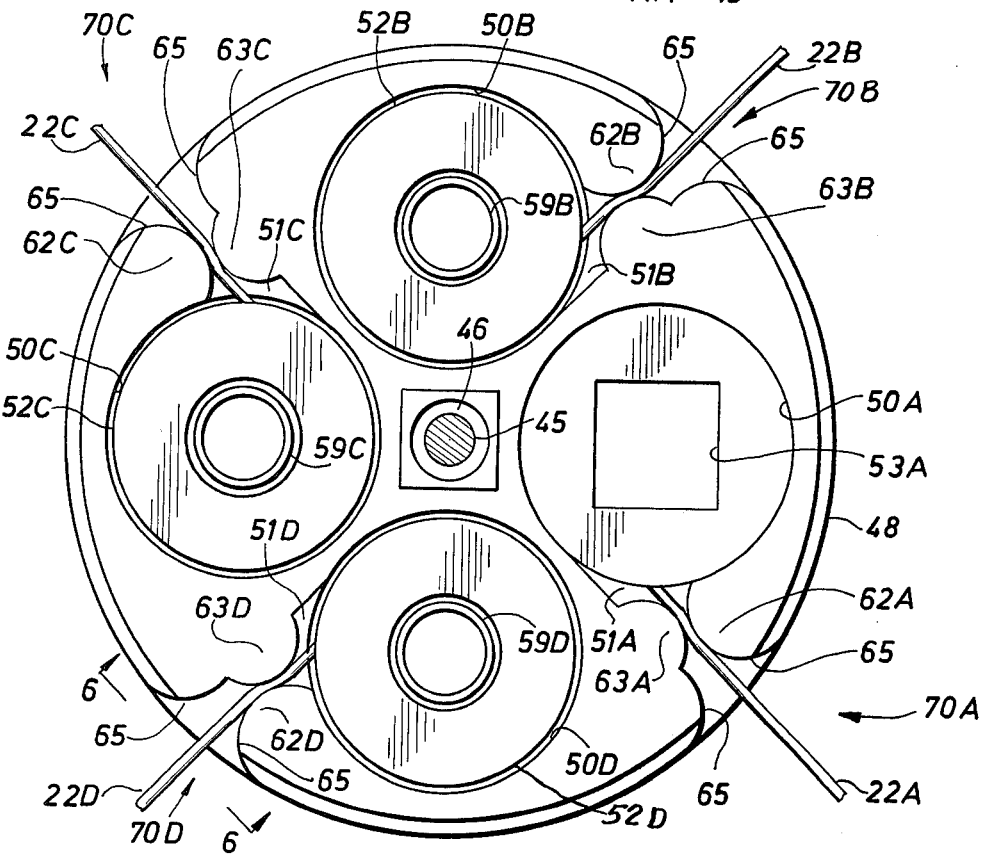
FIG. 4 is a cross sectional view of the apparatus depicted in FIGS. 2 and 3 with the section taken along line 4—4 of FIG. 3 and depicting means for storing a supply of line which may be paid out in preselected lengths to extend the effective working length of the cutting lines from the periphery of the cutting assembly.

Accordingly, body 48 is provided with a plurality of compartments 50 A-D, each of which is spaced in a quadrant of rotary body 48 as shown in FIG. 4. Each of spool openings 50 A-D is connected with one of a correspondingly plurality of line exit channels 51 A-D leading outwardly to the periphery of rotary body 48 as shown. The outward ends of exit channels 51 A-D form windows 70 A-D having sidewalls 65 curved or otherwise streamlined so as to provide a minimum of stress on the cutting lines 22 A-D which are extended radially outwardly therethrough.

Figure 3:
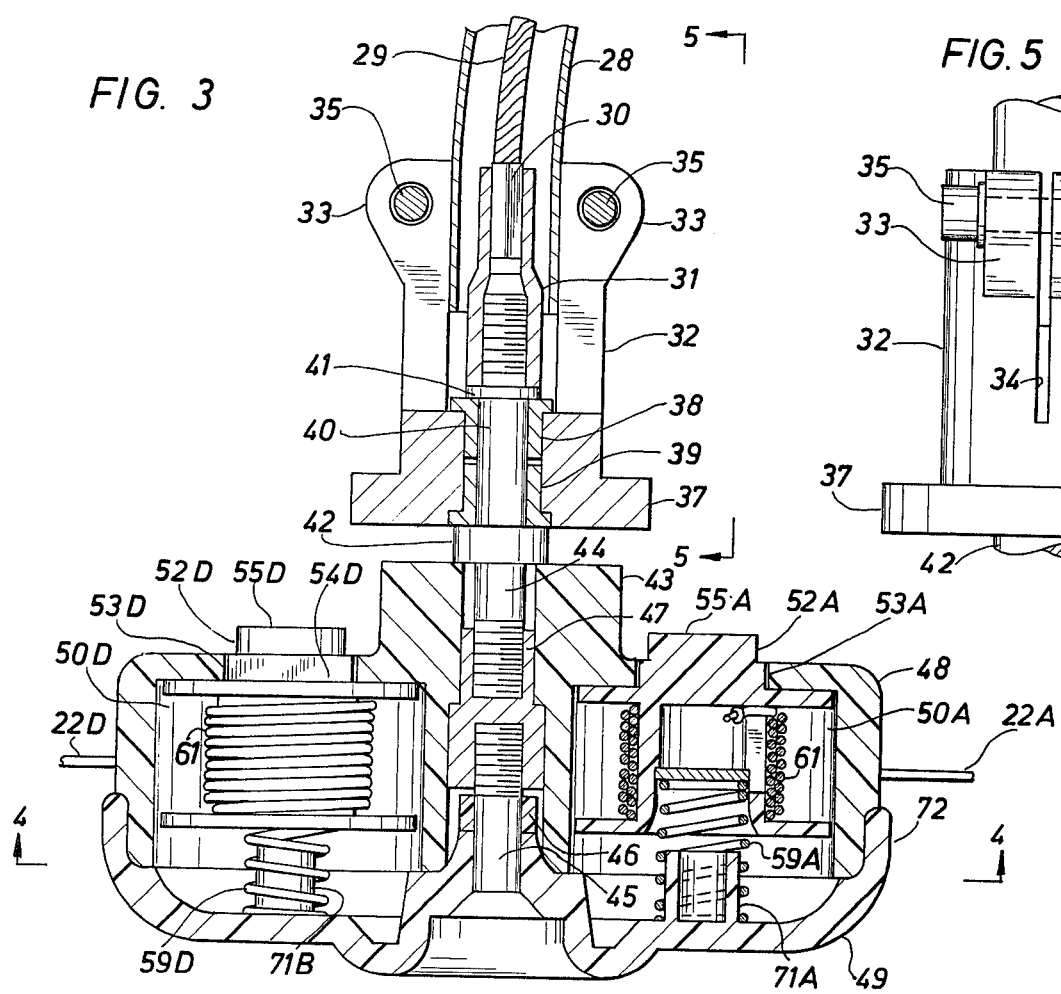
FIG. 3 is a central vertical sectional view of the apparatus depicted in FIG. 2 but showing the same cutting assembly in the static or nonrotating position.
Figure 5:
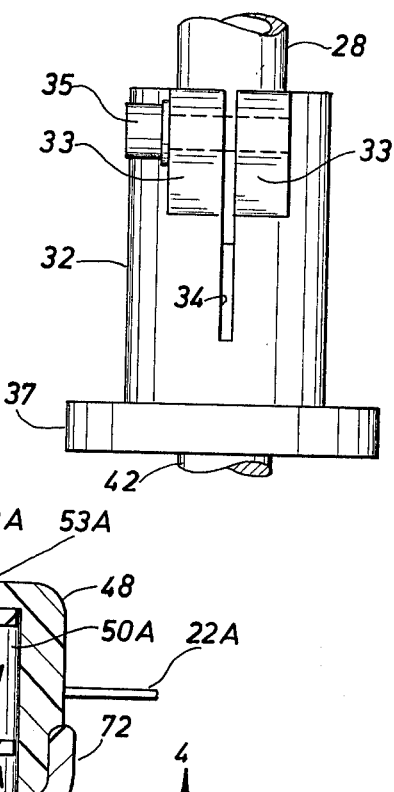
FIG. 5 is a side elevation view along line 5—5 of FIG. 3.

As indicated in FIGS. 2-4, each of the spools 52 A-D are positioned on each of a corresponding plurality of thrust springs 59 A-D, which are secured to the inside surface or face of the cap 49, and which have their upper ends inserted into lower coaxial apertures in the spools 52 A-D. The upper ends of the spools 52 A-D may be formed in the manner of square or no-circular protrusions 54 A-D non-rotatably inserted upwardly through apertures 53 A-D of corresponding shape, and surmounted by knobs 55 A-D.

Each of the thrust springs 59 A-D are secured to the face of cap 49 by a boss member shown in FIG. 3 as 71 A and 71 B. It will be readily apparent that the boss members, 71 A for example, extend upwardly from the face of the cap 49 and are located within each thrust spring. It has been found that the bosses 71 A, 71 B, should extend to at least the midway point of sidewall 72 of cap 49, and be located generally concentrically with respect to thrust springs 59 A-D, compartments 50 A-D, and spools 52 A-D. Stated differently, the bosses should extend longitudinally into and along the spring a distance at least greater than one-thrd of the uncompressed length of the spring when the spring is in a relaxed condition. This anchoring of the thrust springs to the bottom of cap 49 prevents the thrust springs from being displaced from the axis of spools 52 A-D due to centrifugal force during rotation of the assembly, and thus maintains alignment of the spools 52 A-D with respect to compartments 50 A-D. This alignment renders the pay out of line from spools 52 A-D more efficient. Hence, it will be understood, that misalignment between the spools 52 A-D and compartments 50 A-D will cause spools 52 A-D to drag against the walls defining compartments 50 A-D, thereby rendering it difficult to unwind additional line from the spools. The provision of the securing bosses, 71 A for example, prevents this misalignment of the spools in the compartments. Bosses 71 may extend upwardly past the midway point of wall 72 of cap 49, the only provision being that the top of boss 71 not block the movement of protrusion 54 downwardly through aperture 53 against the bias of springs 59.

In addition, each of spools 52 A-D have wound thereon a supply 61 of cutting lines 22 A-D of the aforesaid type, with the inward end projecting through an opening provided in spools 52 A-D through which one end of each of the cutting lines 22 A-D may be threaded and knotted as shown on the right side of FIG. 3. There is thus provided a supply 61 of cutting lines 22 A-D on each of spools 52 A-D. The opposite end of each of cutting lines 22 A-D is arranged for paying out through a line exit channel 51 leading to and terminating in a window 70 as shown in FIG. 4. Each of line exit channels 51 A-D is provided with arcuate snubbers 62 A-D and 63 A-D. The snubbers as will be seen in FIG. 4 are integral with body 48 but may also be press fitted if desired. Each snubber is located within a respective exit channel 51 and will be seen to comprise a first arcuate rib element 62 and a second arcuate rib element 63, the letters A-D indicating the four respective sets in the exit channels. The rib elements 62 and 63 extend across the exit channel partially and are arranged in opposite but facing relationship one to the other. Each of the respective line members 22 A-D pass between the first and second rib elements 62 and 63 respectively. Thus, line members 22 A-D constantly bear against respective first rib elements 62 A-D and second rib elements 63 A-D. The arcuate deformation of the line members by the ribs is such that the line members, once withdrawn from spools 52 A-D, will not retract onto spools 52 A-D due to the spring effect of the winding of line thereupon. This holding and arcuate deformation function of rib elements 62 A-D and 63 A-D maintains a predetermined length of line of the flail once the lines 22 A-D are withdrawn from spools 52 A-D. Upon release of lines 22 A-D, there is no retraction of the lines back through ribs 62 and 63 onto spools 52 A-D. Ribs 62 and 63 effectively arcuately deform and resist the retractive movement of the lines onto the spools and replace the somewhat cumbersome line retainers of U.S. Pat. No. 3,826,068, which retainers were found incapable of deforming or preventing line retraction, especially as the length of line on the spools decreased due to use over a period of time.

The advantages of this arrangement will become immediately apparent when it is recognized that the thrust springs 59 A-D will normally thrust the spools 52 A-D upwardly within the compartments 50 A-D within the rotary body 48, whereby the noncircular portions or protrusions 54 A-D will be inserted upwardly through the apertures 53 A-D in the body 48. When in this position, the spools 52 A-D cannot be rotated within their respective compartments 50 A-D, and this will limit the length of the lines 22 A-D extending from the periphery of the body 48. If, for example, the line 22 A needs to be extended, however, finger pressure on knob 55 A will push the spool 52 A down to disengage the protrusion 54 A from the rectangular aperture 53 A, whereby the spool 52 A may then be conveniently rotated within the compartment 50 A to pay out more line 22 A. When the knob 55 A is released, the spring 59 A will return the protrusion 54 A to the aperture 53 A, whereby the spool 52 A cannot thereafter be rotated. Retraction of payed out line 22 A will be prevented by snubbers 62 A and 63 A.

Although the shape of the protrusions 54 A-D and apertures 53 A-D is illustrated as square, it will be noted that they may be provided with any non-circular configuration suitable for present purposes, except that such configuration is preferably that of an equi-lateral polygon such as a pentagon or hexagon. Thus, the spools 52 A-D may then be rotated to pay out their respective lines 22 A-D in equal segments of substantially predetermined length preferably functionally related to the operation of the depicted apparatus.

For the purpose of further clarity, FIG. 4 is shown with three spools 52 B and C-D properly disposed within their respective compartments 50 B and C-D in the rotary body 48, but with the fourth spool 52 A omitted from the compartment 50 A. Thus, the circular configuration of the compartments 50 A-D will be clearly apparent, as well as the non-circular configuration of the apertures 53 A-D.

In operation, the apparatus is assembled in the condition shown in FIG. 2, with cutting lines 22 A-D extending generally radially outwardly therefrom to the desired lengths. Thereafter, rotary body 48 is rotated by rotation of shaft 29 to the desired rotational speed. As a result, lines 22 A-D will be extended radially outwardly from body 48 within its cutting plane, where cutting, lawn edging, or the like may be effected. As lines 22 A-D become shortened through use, they can thereafter be restored to their original cutting length by terminating rotation of rotary body 48, pressing down on the knobs 55 A-D of each of spools 52 A-D, and pulling on lines 22 A-D to extend them as desired. Thereafter, pressure is relieved on each of the knobs 55 A-D and thrust springs 59 A-D urge the spools 52 A-D back to the lock position, at which point cutting operations can be continued.

It will thus be apparent that this invention provides the art with an apparatus which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for the operator in that the hazardous conditions prevalent in prior art apparatus has been essentially eliminated. By making the apparatus portable, the cutting plane can be effected in any direction so as to accommodate both cutting and trimming operations as heretofore described, thereby eliminating the need for manual labor in certain difficult cutting operations.

The apparatus of this invention can be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting eleme. acts in a resilient fashion in such a manner as not to impart sufficient force to such articles to become missiles; or if they are thrown, it is at a very low velocity relative to prior state of the art machines. Experience has shown that in operating an apparatus of this device with lines of the type described, the cutting lines may accidentally come in contact with the operator's shoes, articles of clothing, or the like, without serious injury as would be the case with prior art devices. Further, in the event a portion of the cutting line is thrown from the apparatus, such thrown portions possess low mass and low kinetic energy and, therefore, quickly loses velocity and energy, thus rendering the same virtually harmless.

It is a particular feature of this invention, as hereinbefore explained, that provision is taken to distribute stress in the cutting lines over as great a length as possible, and this is done by providing that the portions of the lines enclosed within any part of the apparatus are located only adjacent straight or curvilinear surfaces. This is of particular importance insofar as the sidewall portions of the various windows are concerned, since it has been determined that these surfaces constitute the location of the greatest chance for such kinkage and stress fatigue.

Referring to the Figures, it will be seen how the sidewalls 65 of the various windows 70 A-D have curvilinear surfaces having substantial radii for this reason.

It has been determined that the optimum parameters will call for nylon lines having diameters of not substantially less than 0.035 inches nor substantially more than 0.100 inches, an rpm of between 2500-5000, and a cutting length (the length extending beyond the periphery of the cutting head) of substantially 5-9 inches.

In a preferred embodiment of the present invention, a line diameter of about 0.080 inches has been found to be most effective for overall purposes. Thus, with a cutting length of about 6.0 inches, and a head diameter of about 6.0 inches, a cutting path of 18 inches will be provided. An rpm of 4,600 is preferred in this case.

In a more precise relationship, the optimum rpm is preferably stated in terms of tip velocity (since it is the terminal inch of each line that is effective for present purposes), and may thus be stated as follows:

$$V_{min} = \frac{5,600}{\sqrt[3]{d}} \text{ or } \frac{5,600}{d^{0.331}}$$

and $$V_{max} = \frac{21,000}{\sqrt[16]{d}} \text{ or } \frac{21,000}{d^{0.063}}$$

wherein $V$ is the tip velocity of the cutting lines in feet per minute, and $d$ is the cross sectional diameter, in inches, of a monofilament extruded nylon line.

Accordingly, if the line has a diameter of 0.035 inches, the minimum tip velocity should not be less than 17,000 feet per minute, and the maximum velocity should not exceed 26,000 feet per minute. If the line diameter is 0.065 inches, the tip velocities will preferably be between 14,000–25,000 feet per minute, and if the line diameter is 0.100 inches, the tip velocity will be between 12,000–23,000 feet per minute.

As hereinbefore mentioned, the cutting effectiveness is a function of the weight of the lines as well as their tip velocity, and thus it has been determined that the lines will be formed of a material having a specific gravity of not substantially less than 0.90 nor substantially greater than 1.60. Since cutting is effected by substantially only the last inch of each line, it may be stated that the lines should be a dimension such that each line has a kinetic energy of not substantially less than 0.03 foot-lbs., nor substantially more than 7.14 foot-lbs., when the equipment is in operation.

It has further been determined that the extended length of the cutting lines is also a direct function of the size of the cutting head, although the precise explanation for this is not immediately apparent. In any event, it can be stated that this provides that the cutting lines should have a free traveling or unsupported length of not substantially less than 0.50 times the diameter of the cutting head, nor substantially more than 2.2 times such diameter.

It will be apparent from the foregoing that many other variations and modifications may be made in the structures and methods described herein without substantially departing from the essential concept of the present invention. Accordingly, it should be clearly understood that the form of the invention described herein and depicted in the accompanying drawings, are exemplary only and are not intended as limitations in the scope of the present invention.

What is claimed is:

1. As a sub-assembly in apparatus for cutting vegetation and the like, means comprising a rotary body rotatable about a concentric axis and having a plurality of internal circular compartments spaced about a concentric axis and each communicating separately with a corresponding plurality of equally spaced apart apertures each defined by spaced apart curvilinear wall portions of the periphery of said body, said compartments in said rotary body also each communicating with one of a corresponding plurality of non-circular apertures equally spaced about said axis and between said axis and said periphery of said body, a corresponding plurality of spool-like members each removably disposed in one of said circular compartments in said body and each having circular upper and lower flange portions rotatable in said compartments and a non-circular knob-like portion protruding from an upper flange portion and insertable in the corresponding one of said non-circular apertures in said body, a corresponding plurality of non-metallic line members each having one end secured to and wound about one of said spool members and having its other end extending from the respective compartment through the corresponding one of said apertures and radially outwardly of the periphery of said body, a closing member detachably fastened to said rotary body for forming with said body a rotatable housing assembly securing said spool members in said compartments, a corresponding plurality of spring members mounted in said closing member and yieldably thrusting said non-circular knob-like portions of said spool members insertably into and through said non-circular apertures in said body, and means for securing each of said spring members to said closing member, said securing means extending longitudinally into and along said spring member a distance greater than one third of the uncompressed length of said spring during relaxation of said spring.

2. The sub-assembly described in claim 1 wherein the securing means attach each of said spring members to the bottom wall of said closing member.

3. The sub-assembly described in claim 2 wherein the securing means comprise four bosses extending upwardly from the bottom wall of said closing member.

4. The sub-assembly described in claim 3 wherein each boss is disposed concentrically with respect to one of said spring members.

5. The sub-assembly described in claim 4 wherein each boss is located within one of said spring members.

6. The sub-assembly described in claim 5 wherein each boss extends upwardly to at least the mid-way point of the side wall of said closing member.

7. As a sub-assembly in apparatus for cutting vegetation and the like, means comprising a rotary body rotatable about a concentric axis and having a plurality of internal circular compartments spaced about a concentric axis and each communicating separately with a corresponding plurality of equally spaced-apart apertures each defined by spaced apart curvilinear wall portions of the periphery of said body, said compartments in said rotary body also each communicating with a corresponding plurality of non-circular apertures equally spaced about said axis and between said axis and said periphery of said body, a corresponding plurality of spool-like members each removably disposed in one of said circular compartments in said body and each having circular upper and lower flange portions rotatable in said compartments and a non-circular knob-like portion protruding from an upper flange portion and insertable in the corresponding one of said non-circular apertures in said body, a corresponding plurality of separate non-metallic line members each having one end secured to and about one said spool members and having its other end extending from the respective compartment through the corresponding one of said apertures and radially outwardly of the periphery of said body, a closing member detachably fastened to said rotary body for forming with said body a rotatable housing assembly securing said spool members in said compartments, a corresponding plurality of spring members mounted in said closing member and yieldably thrusting said non-circular knob-like portions of said spool members insertably into and through said non-circular apertures in said body, snubber means for arcuately deforming a portion of the line members and for securing said arcuately deformed portion of the line members within said housing, a corresponding plurality of exit channels in said body, each communicating one of said compartments with one of said spaced apart apertures, said snubber means being located within each of said exit channels, and each snubber means in each exit channel comprise first and second arcuate rib elements extending partially across said exit channel.

8. The sub-assembly described in claim 7 wherein the first and second arcuate rib elements in each channel are in generally opposite but facing relationship one to the other.

9. The sub-assembly described in claim 8 wherein the line member in each channel passes between the first and second arcuate rib elements of the snubber means.

10. As a sub-assembly in apparatus for cutting vegetation and the like, means comprising a rotary body rotatable about a concentric axis and having a plurality of internal circular compartments spaced about a concentric axis and each communicating separately with a corresponding plurality of equally spaced apart apertures each defined by spaced apart curvilinear wall portions of the periphery of said body, said compartments in said rotary body also each communicating with one of a corresponding plurality of non-circular apertures equally spaced about said axis and between said axis and said periphery of said body, a corresponding plurality of spool-like members each removably disposed in one of said circular compartments in said body and each having circular upper and lower flange portions rotatable in said compartments and a non-circular knob-like portion protruding from an upper flange portion and insertable in the corresponding one of said non-circular apertures in said body, a corresponding plurality of non-metallic line members each having one end secured to and wound about one of said spool members and having its other end extending from the respective compartment through the corresponding one of said apertures and radially outwardly of the periphery of said body, a closing member detachably fastened to said rotary body for forming with said body a rotatable housing assembly securing said spool members in said compartments, a corresponding plurality of spring members mounted in said closing member and yieldably thrusting said non-circular knob-like portions of said spool members insertably into and through said non-circular apertures in said body, means for securing each spring member to said closing member, said securing means extending longitudinally into and along said spring a distance greater than one third of the uncompressed length of the spring during relaxation of the spring, snubber means for arcuately deforming a portion of the line members and for securing said arcuately deformed portion of the line members within said body.

11. The sub-assembly described in claim 10 wherein the securing means attach each of said spring members to the bottom wall of said closing member.

12. The sub-assembly described in claim 11 wherein the securing means comprise four bosses extending upwardly from the bottom wall of said closing member.

13. The sub-assembly described in claim 10 wherein each boss is disposed concentrically with respect to one of said spring members.

14. The sub-assembly described in claim 13 wherein each boss is located within one of said spring members.

15. The sub-assembly described in claim 14 wherein each boss extends upwardly to at least the mid-way point of the side wall of said closing member.

16. The sub-assembly described in claim 10 and including a corresponding plurality of exit channels in said body each communicating one of said compartments with one of said spaced apart apertures, said snubber means being located within each of said exit channels.

17. The sub-assembly described in claim 16 wherein each snubber means in each exit channel comprises a first arcuate rib element extending partially across said exit channel.

18. The sub-assembly described in claim 17 wherein each snubber means in each exit channel comprises a second arcuate rib element extending partially across said exit channel.

19. The sub-assembly described in claim 18 wherein the first and second arcuate rib elements in each channel are in generally opposite but facing relationship one to the other.

20. The sub-assembly described in claim 19 wherein the line member in each channel passes between the first and second arcuate rib elements of the snubber means.

* * * * *